United States Patent [19]

Anderson et al.

[11] 4,319,891

[45] Mar. 16, 1982

[54] COMBINED SONIC AGGLOMERATOR/CROSS FLOW GAS FILTRATION SYSTEM AND METHOD

[75] Inventors: Gerald L. Anderson, Romeoville; Michael Onischak, Olympia Fields; William F. Rush, Tinley Park, all of Ill.

[73] Assignee: Gas Research Institute, Chicago, Ill.

[21] Appl. No.: 206,341

[22] Filed: Nov. 13, 1980

[51] Int. Cl.³ .................... B01D 51/04; B01D 51/08; B01D 46/24

[52] U.S. Cl. .......................................... 55/15; 55/97; 55/262; 55/277; 55/301; 55/315; 55/417; 55/DIG. 25; 422/186; 423/210

[58] Field of Search .............. 55/15, 97, 262, 277, 55/292, 301, 304, 315, 318, 332, DIG. 25, 417, 523; 422/186; 423/210

[56] References Cited

U.S. PATENT DOCUMENTS

| | | | |
|---|---|---|---|
| 2,474,017 | 6/1949 | Smith et al. | 55/301 |
| 2,720,939 | 10/1955 | Stokes | 55/15 |
| 2,721,626 | 10/1955 | Rick | 55/97 |
| 3,002,915 | 10/1961 | Royder | 55/523 |
| 3,172,744 | 3/1965 | Fortman et al. | 55/15 |
| 3,461,651 | 8/1969 | Ingen | 55/277 |
| 3,825,480 | 7/1974 | Pelofsky et al. | 55/277 |
| 3,892,543 | 7/1975 | Margraf | 55/97 |
| 3,995,005 | 11/1976 | Teller | 55/262 |
| 4,139,351 | 2/1979 | Ostertag et al. | 55/97 |
| 4,156,599 | 5/1979 | Margraf | 55/DIG. 25 |

FOREIGN PATENT DOCUMENTS 2617491  11/1976  Fed. Rep. of Germany ........ 55/523

*Primary Examiner*—David L. Lacey
*Attorney, Agent, or Firm*—Thomas W. Speckman

[57] ABSTRACT

A gas filtration apparatus and process combining sonic agglomeration with porous cross flow filtration. The apparatus and process is particularly suited to gas streams comprising particulates of under 10 microns in diameter, such as the effluent gas stream of coal gasifiers, which are at a high temperature and high pressure. The smaller particles are agglomerated by sonic agglomeration and a portion of the gas stream is then passed through a porous cross flow filter resulting in a particulate-free gas stream while not requiring the high pressure drop normally associated with filtration of small particulates. The gas stream through the sonic agglomeration portion may be seeded to enhance particulate agglomeration and/or to induce chemical reaction of undesired gaseous components for their removal as solids.

18 Claims, 2 Drawing Figures

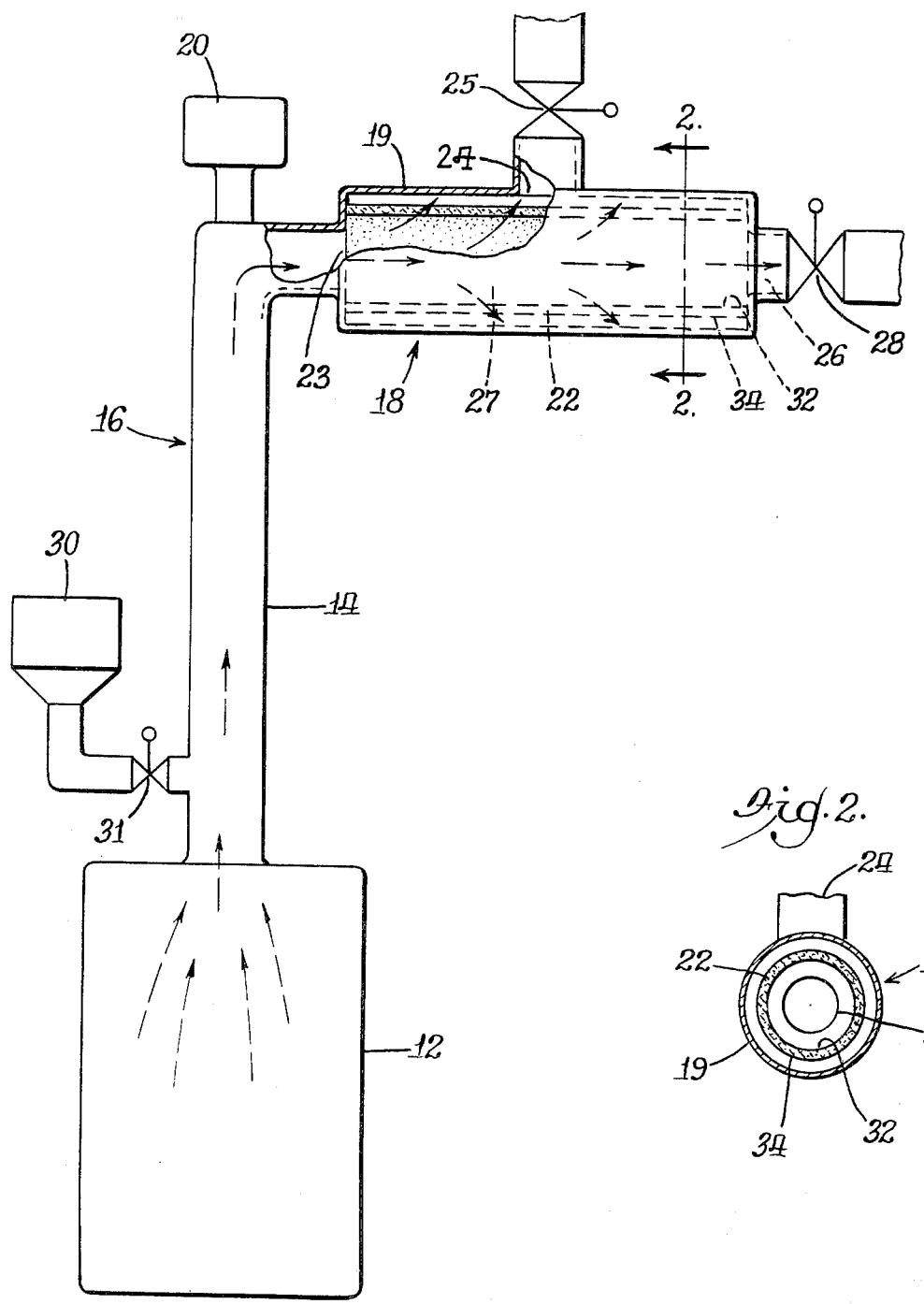

COMBINED SONIC AGGLOMERATOR/CROSS FLOW GAS FILTRATION SYSTEM AND METHOD

BACKGROUND OF THE INVENTION

This invention relates to gas filtration apparatus and process, and more particularly to gas filtration apparatus and process which combines sonic agglomeration with porous cross flow filtration.

Gas streams comprising small particles are produced by many chemical processes and by combustion processes, such as the particulates in the effluent gas stream of coal gasifiers. Such particulate matter and frequently, undesired gases should be removed before the gas stream is passed to downstream equipment or processes or is released to the atmosphere. It has been particularly difficult to remove such particulate matter from high temperature and high pressure gas streams frequently encountered. Many of the coventional methods, such as cyclones and electrostatic precipitation fail under high pressure conditions. Particles which are over 10 microns in diameter may be removed from gas streams by conventional porous filters and the like, but smaller particles are difficult to remove because the porosity of the filter must be so small that it creates a substantial pressure drop across the filter. This is undesirable because the higher pressure drop requires greater energy and may inhibit the combustion process. Thus, porous flow through filters do not remove small particles from gas streams efficiently.

Particles in a turbulent gas stream collide with each other and may agglomerate with other particles on impact to form larger agglomerates. The number of collisions may be increased by confining the stream in a tube or flue, and subjecting the particles in the flue to a sonic field. This process, known as sonic agglomeration, has been used for many years to agglomerate small particles into larger agglomerates.

Sonic agglomerators have been used in combination with inertial separators, such as cyclones, as described in U.S. Pat. Nos. 2,935,375 and 3,172,744. Cyclones spin the gas stream, exerting centrifugal force on the particles in the stream. The centrifugal force propels the particles against the outer wall of the cyclone, from which they may be reoved. The agglomerates may break up into many small particles on impact with the outside wall, however, which negates the beneficial effects of the sonic agglomerator. Also, small particles may follow the air stream through the clean gas exit rather than be removed by the device. U.S. Pat. No. 3,681,009 teaches introducing secondary particles of water vapor into a particulate contaminated gas stream and then exposing the gas stream to a sonic field causing agglomeration followed by removal of the agglomerates from the gas stream in a cyclone separator.

Non-inertial capture systems, such as electrostatic precipitation, do not suffer these limitations of cyclones, but are difficult to utilize at elevated temperatures and pressures due to problems such as electric arc breakdown.

Water vapor may be introduced into a gas stream to trap and remove particles which have been subjected to sonic agglomeration, as in U.S. Pat. No. 3,390,869, and water may be passed over a screen filter to remove agglomerated particles, as in U.S. Pat. No. 3,763,634. These systems are impractical in applications in which the gas stream is at temperatures, for instance, between about 200° C. and 1000° C., because the water vaporizes. U.S. Pat. No. 3,834,123 teaches agglomeration of dust particles by ultrasonics, which is stated to be unreliable and requires too high an expenditure of energy for use in combination with pocket or bag textile filters and suggests recycling dust released from the filter to the contaminated gas stream. This patent teaches the necessary reverse flow cleaning cycle when using a textile filter. U.S. Pat. No. 2,769,506 teaches vibration of bag filters by sound waves to free collected aerosols from the external surfaces of the bags. Bag filters, of course, cannot be used at high temperatures.

None of the prior art known to the applicants suggests the combination of sonic agglomeration followed by cross flow filtration which provides removal of small particles, under 10 microns diameter, on a continuous basis from a high temperature gas stream.

It is an object of this invention to provide apparatus and process for removal of micron and sub-micron particles from a gas stream utilizing the combination of sonic agglomeration and cross flow filtration.

It is another object of this invention to provide apparatus and process for removal of particulates from gas streams at temperatures of about 200° C. to about 1000° C.

It is yet another object of this invention to provide apparatus and process for continuous removal of particulates from gas streams avoiding the need for reverse flow cycles for cleaning filters.

It is still another object of this invention to provide apparatus and process for continuous removal of particulates from high temperature gas streams while incurring a relatively small pressure drop across the apparatus.

SUMMARY OF THE INVENTION

In keeping with one aspect of this invention, apparatus for removing small particles, especially 10 micron and smaller, from a gas stream having a temperature of about 200° C. to 1000° C. and a pressure of up to 2000 lbs/sq. in. comprises a sonic agglomerator which enhances the agglomeration of small particles to form agglomerates at least 10 microns in diameter, in combination with a porous cross flow filter. The agglomerator regulates the filter cake deposited in the filter. The filter comprises a porous filter element having pore diameters of less than the diameter of the agglomerates in a filter housing, an entrance port in the filter housing on the input side of the element, a clean gas port for that portion of the gas stream which flows through the filter element, and a contaminated gas port through which about 5 to 50 percent of the gas stream is released without flowing through the filter element. The agglomerates are continuously removed from the filter through the contaminated port. Additional particles may be injected into the gas stream, if desired, to remove pollutant gases by reaction therewith and to increase removal efficiency when the gas has low concentrations of contaminant particles. The particles may also be introduced to induce agglomeration thereby increasing the mean particle size of the agglomerate.

BRIEF DESCRIPTION OF THE DRAWINGS

The above mentioned and other features of this invention, and the manner of obtaining them will become more apparent, and the invention will be best understood by reference to the following description of preferred embodiments of the invention taken in conjunction with the accompanying drawings in which:

FIG. 1 is a schematic diagram of a sonic agglomerator in combination with a porous cross flow filter in accordance with one embodiment of this invention; and FIG. 2 is a section view of a cross flow filter taken along lines 2—2 in FIG. 1.

DESCRIPTION OF THE PREFERRED EMBODIMENT

As seen in FIGS. 1 and 2, a gas stream comprising small particles produced in combustion chamber or reactor 12, such as a coal gasifier or similar device, pass through sonic agglomerator 16 and porous cross flow filter 18. The clean gas stream may be used for any desired purpose, such as passed from clean gas conduit 24 to catalyst beds for gas upgrading, to turbines for power recovery, or may be released into the atmosphere. The gas stream from the combustion chamber comprises combustion products including pollutant gases and fine particulates which must be removed before the gas may be used or released to the atmosphere. If the particles are not removed, catalyst beds may be plugged, and the turbines may be eroded. Pollutant gas and particle removal is also desirable to preserve the environment.

While this invention is useful in removing small particles and pollutant gases from any contaminated gas stream, such as from a combustion device or any chemical process producing such an effluent stream and may be operated under atmospheric conditions, most important benefits are realized when a high temperature gas stream, at temperatures of about 200° C. to 1000° C. under elevated pressures are treated. High temperatures increase particle agglomeration and desired pollutant gas reaction and high pressures increase both sonic power output and efficiency.

Sonic agglomerator 16 comprises sound source 20 which may be provided at either end of the elongated tube 14. Suitable generators of a sonic field for use in this invention are well known to one skilled in the art. Suitable frequencies for agglomeration in accordance with this invention are about 3 to about 15 Khz, about 8 to about 12 kHz being preferred, at intensities of about 100 to about 170 dB, about 130 to about 160 dB being preferred. Residence time of a particle in the sonic field may be about 1 to about 20 seconds, about 2 to about 10 seconds being preferred.

The length of tube 14 may vary according to the requirements of the system. Lengths in the order of about 8 to 16 feet are suitable, about 12 feet long may result in about 98 percent particulate removal from the gas stream under most desired conditions.

The exhaust gas in tube 14 may be at ambient temperatures and pressures or at elevated temperatures and pressures, such as effluent gas streams of combustion devices and chemical reactors of about 200° C. to 1000° C., and about 500 to 2000 psig. The sound source 20 exposes the particles to an intense sound field which increases the relative motion and number of collisions between particles, enhancing the rate of particle agglomeration. In this manner, small particles may be agglomerated into larger agglomerates.

Cross flow filter 18 comprises a generally cylindrical housing 19 housing concentric rigid, porous filter element 22 having an input side 32 and an output side 34, input port 23 adjacent the input side 32, clean gas port 24 adjacent output side 34, and an exit port 26 adjacent input side 32. Filter structures with a higher surface area to volume ratio, such as filter blocks, may be used in place of the cylindrical shape, if desired.

Cross flow filter element 22 may be any suitable material, such as porous ceramic, having pore diameters smaller than the diameters of the agglomerated particles. Suitable pore diameters for most systems are about 5 to about 15 microns, about 8 to about 12 microns being preferred. A filter element used in tests had a pore diameter of about 10 microns, a thickness of about ¼ inch, and a length of about 47 inches.

Contaminated gas enters filter 18 through input port 23 and a portion of the gas passes through filter element 22 and leaves the filter as clean gas through conduit 24 while the remainder of the gas stream passes through central passage 27 to port 26. The flow of gas through port 26 may be controlled by valve 28, and the flow through clean gas port 24 may be controlled by valve 25. Valve 28 may be adjusted so that between approximately 5 and 50 percent of the gas stream entering filter 18 passes through central passage 27 and exit port 26, and about 50 to 95 percent of the air passes through filter element 22 and leaves filter 18 through clean air port 24. Contaminant particles smaller than the agglomerates are retained in the gas stream passing through central passage 27 and leave the filter with the gas stream through exit port 26.

Filter element 22 retains particles larger than its pore diameters on input side 32 while providing clean gas to clean gas port 24. The particles retained on input side 32 are continuously swept out of filter 18 through exit port 26, so that filter element 22 does not become clogged and need not be subjected to reverse flow cleaning cycles. The agglomerator also helps prevent clogging by vibrating the filter element slightly. The small quantity of dirty gas released through exit port 26 may subsequently be cleaned by conventional filtration methods or may have the larger agglomerates removed and the gas with small particulates recycled to sonic agglomerator 16.

A particulate seed hopper 30 with valve 31 may be provided to the entrance end of tube 14 of agglomerator 16. Seed particles in hopper 30 having a known size and density may be injected into the contaminated gas stream entering tube 14 to act as initiators of agglomeration of the small particulates in the contaminated gas stream. Seed particles may also be used to enhance agglomeration of small contaminant particles when the concentration of the contaminant particles is so low that the particles do not agglomerate as efficiently as desired. When the mean contaminant particle size is small and the contaminant particles do not agglomerate to a sufficient size, seed particles may be added to increase the agglomerate size. Addition of particles of a specific chemical material to agglomerator 16 may be used to cause chemical reaction of an undesired component of the gas stream with the added particle to form a solid reaction product, thereby removing the undesired gaseous component from the gas stream. The reaction product is then removed by the cross flow filter as described above.

Tests were performed with an apparatus as shown in FIG. 1 except that a premixed and known particulate contaminated gas stream was fed to sonic agglomerator 16 under ambient conditions of temperature and pressure. Particles were obtained by screening particles of char fines from a coal gasification pilot plant to obtain particles smaller than 10 microns. About 80 percent of the particles in the contaminated gas stream were less than 4 microns in diameter, about 16 percent were between 4 and 8 microns, and about 4 percent were between 8 and 12 microns. The contaminated gas stream had a loading of 45 grams/cubic meter and a velocity of 3 meters/second through a tube of 2 inches in diameter and 50 feet in length with a sonic generator at one end creating a sonic field at 3.9 kHz and 116 dB. With sonic agglomeration, the percentage of particles which were less than 4 microns in size dropped to about 68 percent; the percentage of particles between 4 and 8 microns rose to about 28 percent; and the percentage of particles between 8 and 12 microns dropped to about 2 percent.

When additional tests were performed with an inlet pressure of 1000 lbs/sq.in., a temperature of 265° C., a linear gas velocity of 3 ft./sec., dust loading of 35 g/cubic meter and the particle size distribution set forth above, examination of the clean gas at port 24 showed no detectable solids were present in the gas stream in 90 minutes of operation. The measuring equipment was responsive to greater than 2 percent solid remainder, so the test establishes that at least 98 percent of the particles were removed. Other tests showed that 95 percent of the gas stream could be cleaned under high temperature, high pressure conditions to remove virtually all particles larger than 2 microns while maintaining a dust loading lower than 0.02 g/cubic meter (STP) in the clean gas.

When sonic agglomeration is combined with cross flow filtration, approximately the same removal efficiency may be achieved with a 10 micron pore diameter filter as is obtained with a 2 micron pore diameter filter without sonic agglomeration. The pressure drop across the 10 micron filter is about one-half that of a 2 micron filter, which reduces the energy requirements for filtration. In addition, the power requirements of a sonic agglomerator and cross flow filter are estimated to be less than that required by a filter alone, and no more than that required by systems using a cyclone.

Sonic agglomeration in combination with cross flow filtration permits removal of 2 to 10 micron particles in a porous cross flow filter having a low pressure drop. Seed particles in the sonic agglomerator are useful for removing pollutant gases, for removing low concentrations of particles from gas streams, and for increasing the mean particle size of agglomerates if the contaminant particles are not agglomerated to a desired agglomerate size by themselves. This process may be used without liquids or electrostatic devices, and therefore may be operated at high temperature and under high pressure. The cross flow filter may be run continuously, and is self-cleaning without the need of reverse flow cycles. The agglomerator helps prevent clogging by vibrating the filter element slightly.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. Filtration apparatus for removing particles from gas streams comprising in combination;

a sonic agglomerator comprising a gas conduit and a sound source generating a sonic field within said gas conduit for agglomerating said particles into agglomerates as said gas stream passes through said conduit; and a cross flow filter comprising a housing and a rigid porous filter element having an interior side and an exterior side positioned within said housing; said filter housing having an input port in communication with the exit of said sonic agglomerator gas conduit and said filter element interior side, a clean gas port in said filter housing in communication with said filter element exterior side, and an exit port in said filter housing in communication with said filter element interior side, said filter element having pore diameters of a size to retain said agglomerates adjacent said interior side of said filter element, whereby a portion of said gas stream passes through said clean gas port and a portion of said gas stream and said agglomerates pass through said exit port of said filter housing.

2. The apparatus of claim 1 wherein said sound source is constructed to maintain a sonic field in said conduit of frequencies of about 3 to about 15 kHz and an intensity about 100 to about 170 dB.

3. The apparatus of claim 2 wherein said sound source is constructed to maintain a sonic field in said tube of frequencies of about 8 to about 12 kHz and at an intensity of about 130 to about 160 dB.

4. The apparatus of claim 1 additionally comprising a seed hopper and conduit means including valve means connecting said seed hopper to said gas conduit for injecting seed particles into the entrance to said conduit.

5. The apparatus of claim 1 wherein said filter element comprises pores of about 5 to about 15 microns in diameter, and said filter comprises control means to allow passage of about 5 to about 50 percent of said gas stream through said exit port without passing through said filter element.

6. The apparatus of claim 5 wherein said pore diameters are about 8 to about 12 microns.

7. The apparatus of claim 5 wherein said control means comprises a valve in said exit port.

8. The apparatus of claim 5 wherein said control means comprises a valve in said clean gas port for gas passing through said filter element.

9. A process for removing small particles from gas streams comprising the steps of: agglomerating said small particles into larger agglomerates by passing said small particles through a sonic field provided by a sonic agglomerator having a gas conduit and then removing said agglomerates from said gas stream by passing said gas stream with said agglomerates through a cross flow filter comprising a housing and a rigid, porous filter element having an interior side and an exterior side positioned within said housing, said filter housing having an input port in communication with the exit of said sonic agglomerator gas conduit and said filter element interior side, a clean gas port in said filter housing in communication with said filter element exterior side, and an exit port in said filter housing in communication with said filter element interior side, said filter element having pore diameters of a size to retain said agglomerates adjacent said interior side of said filter element, whereby a portion of said gas stream passes through said clean gas port and a portion of said gas stream and said agglomerates pass through said exit port of said filter housing.

10. The process of claim 11 wherein said gas stream has a temperature of about 200° C. to about 1000° C.; said larger agglomerates are about 10 microns and more in diameter and said larger agglomerates are removed from said gas stream by passing about 50 to about 95 percent of said gas stream through said filter element, said filter element having pore diameters of about 5 to about 15 microns.

11. The process of claim 9 wherein said pore diameters are about 8 to about 12 microns.

12. The process of claim 9 wherein said sonic field has a frequency about 3 to about 15 kHz and an intensity of about 100 to about 170 dB.

13. The process of claim 9 wherein said sonic field has a frequency of about 8 to about 12 kHz and an intensity of about 130 to about 160 dB.

14. The process of claim 9 wherein the pressure of said gas stream is about 500 to about 2000 psig.

15. The process of claim 9 wherein seed particles are injected into said sonic field.

16. The process of claim 15 wherein said seed particles chemically react with an undesired component of said gas stream to form a solid reaction product particle.

17. The process of claim 9 wherein the residence time in said sonic field is about 1 to about 20 seconds.

18. The process of claim 9 wherein the residence time in said sonic field is about 8 to about 10 seconds.

* * * * *